Aug. 13, 1963 R. A. GOEPFRICH 3,100,340
BRAKE SHOE AND METHOD OF MAKING SAME
Original Filed Nov. 28, 1950 5 Sheets-Sheet 4

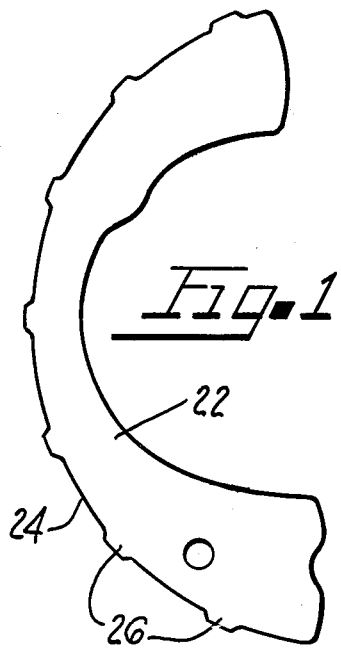
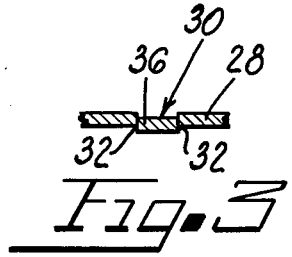
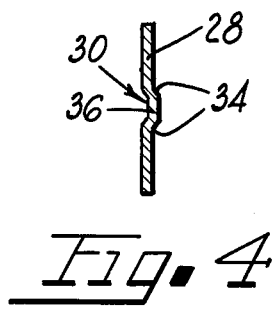
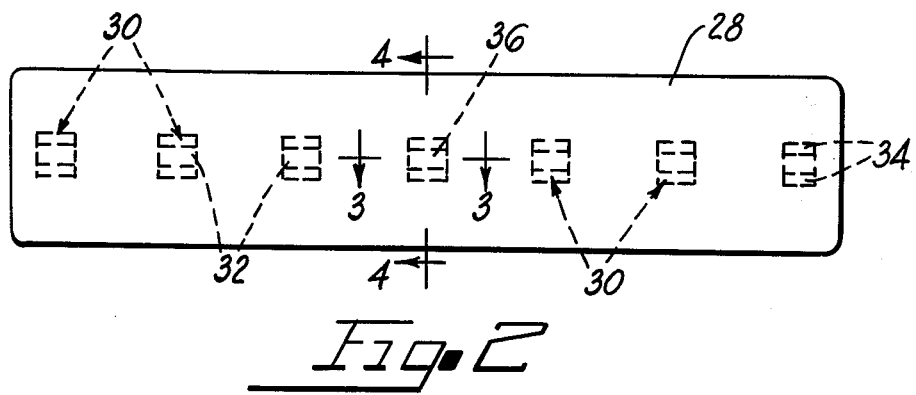
INVENTOR.
RUDOLPH A. GOEPFRICH
BY John A. Young
ATTORNEY INVENTOR.
RUDOLPH A. GOEPFRICH
BY John A. Young
ATTORNEY

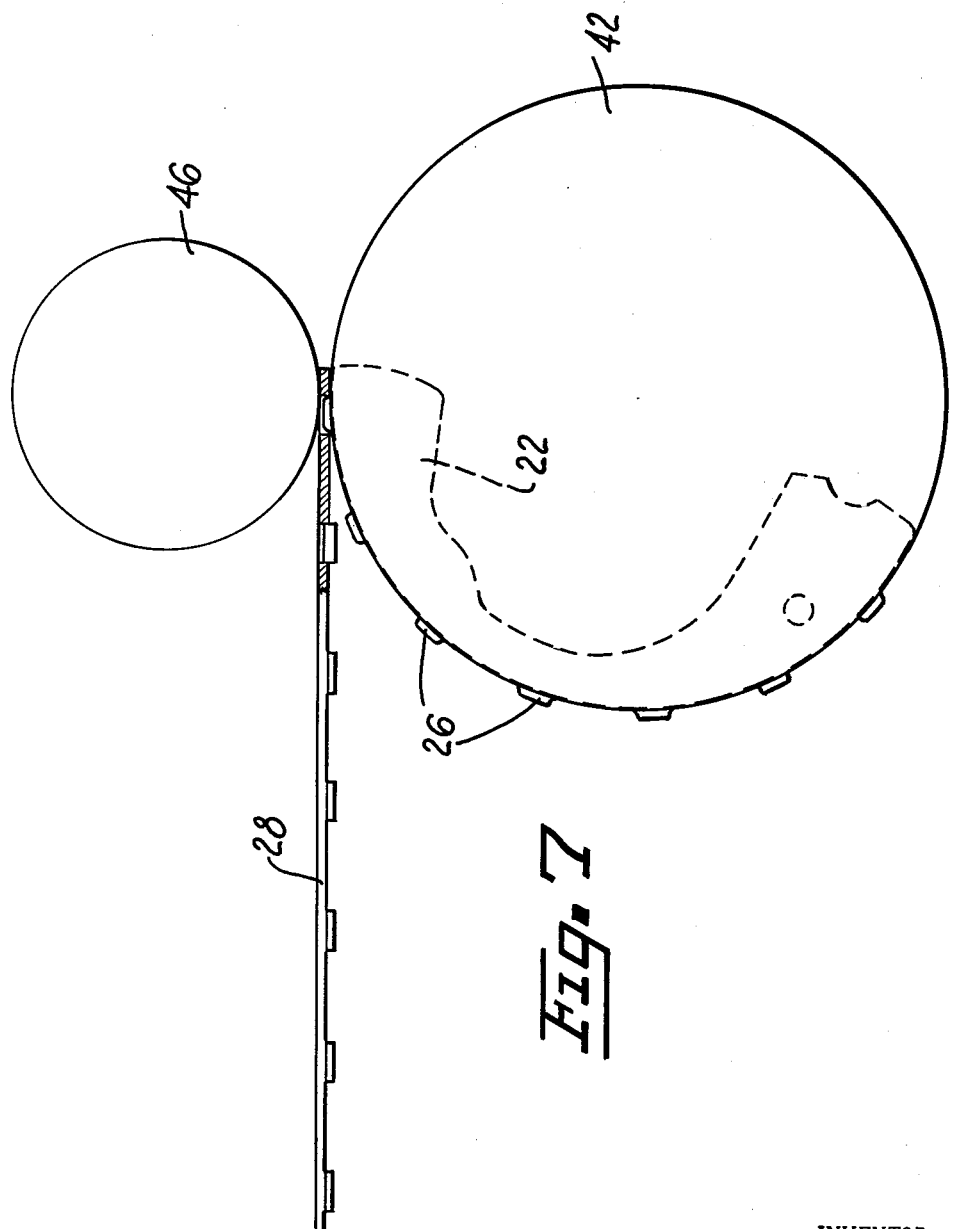

INVENTOR.
RUDOLPH A. GOEPFRICH
BY
John A. Young
ATTORNEY

United States Patent Office 3,100,340
Patented Aug. 13, 1963

3,100,340
BRAKE SHOE AND METHOD OF MAKING SAME
Rudolph A. Goepfrich, South Bend, Ind., assignor to The Bendix Corporation, a corporation of Delaware
Application July 10, 1958, Ser. No. 748,565, now Patent No. 2,964,142, dated Dec. 13, 1960, which is a continuation of Ser. No. 197,933, Nov. 28, 1950. Divided and this application Feb. 15, 1960, Ser. No. 8,599
8 Claims. (Cl. 29—520)

This invention relates to a "built-up" brake shoe, and to a method of manufacturing such a shoe. This application is a divisional application of my copending application No. 748,565 filed July 10, 1958, now U.S. Patent No. 2,964,142 issued December 13, 1960, and which is a continuation-in-whole of application Serial No. 197,933, filed November 28, 1950, now abandoned.

The general object of the invention is to provide a brake shoe which can be fabricated from separate web and rim pieces without requiring a welding operation. Floyd et al. Patent No. 2,041,461 discloses a welding machine which simultaneously: (a) forms a flat rim to arcuate shape, and (b) welds the rim to the web. Millions of shoes have been fabricated by machines of this type.

A specific object of the present invention is to utilize the dual function principle of Patent No. 2,041,461 (i.e. the arrangement by means of which the rim is simultaneously formed to arcuate shape and secured to the web), while eliminating the need for welding, thereby reducing the cost of manufacturing the shoe. By substituting a "staking" operation for the welding operation of the patent, the cost of the electric current and of the electrodes used in welding can be eliminated. By retaining the "rolling" principle of the welding machine, I maintain the high production rate which can be obtained with a machine using that principle.

The above and other objects and features of the invention will appear more fully hereinafter from a consideration of the following description, taken in connection with the accompanying drawings, wherein a plurality of embodiments of the invention are illustrated by way of example. In the drawings:

FIGURE 1 shows the profile of a brake shoe web ready to be secured to a rim;

FIGURE 2 is a plan view of a flat rim blank after the first rim-forming operation;

Figure 5:
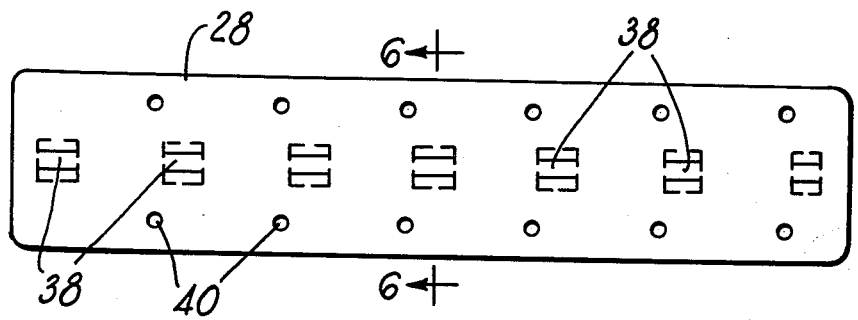
Figure 6:
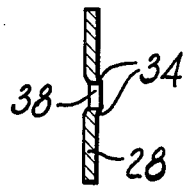
Figure 8:
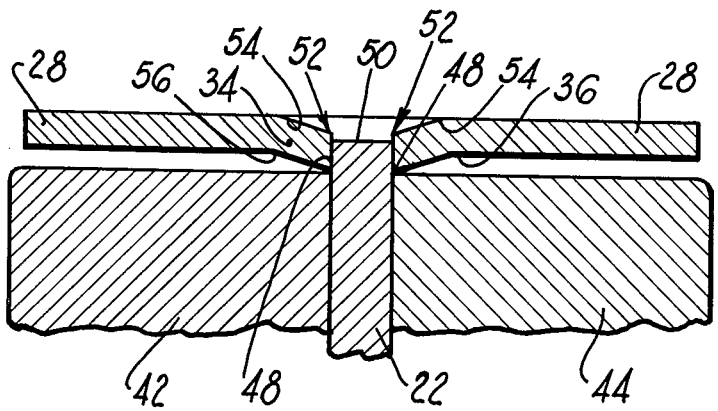
Figure 9:
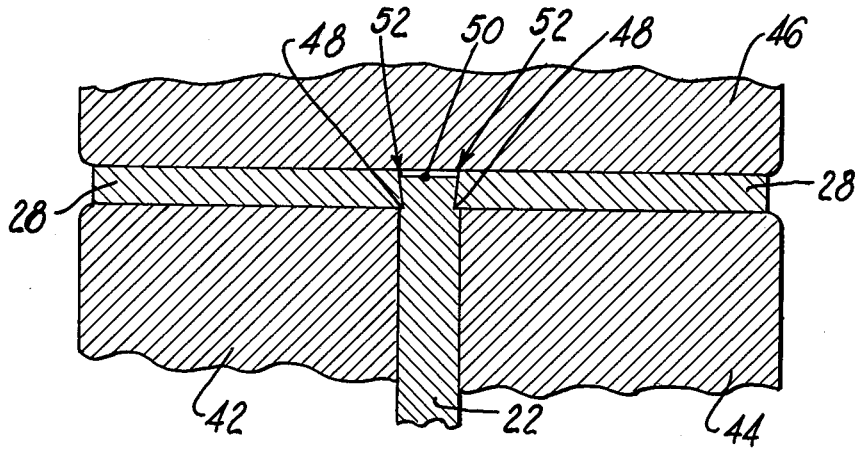
Figure 10:
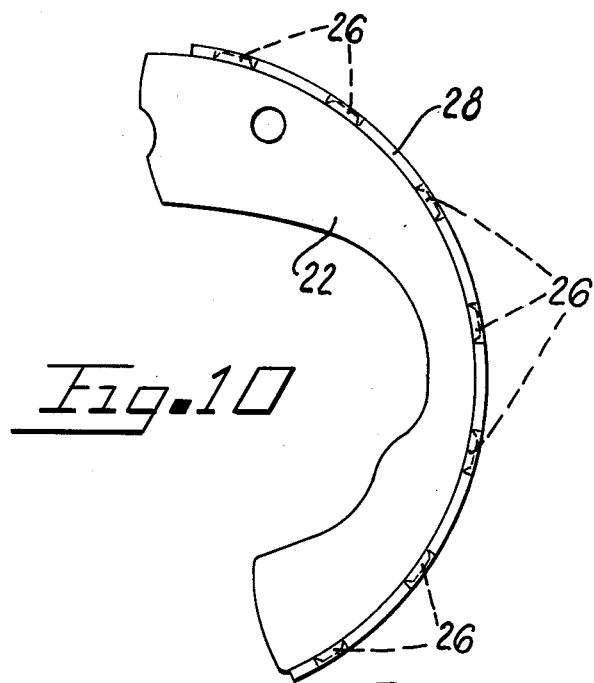

FIGURES 3 and 4 are sections taken on the lines 3—3 and 4—4, respectively of FIGURE 2;

FIGURE 5 is a plan view of the flat rim blank after the slots have been formed;

FIGURE 6 is a section taken on the line 6—6 of FIGURE 5;

FIGURE 7 is a side elevation, showing the web and rim in position at the start of the rolling operation, the first web projection being in engagement with the first rim slot;

FIGURE 8 is an enlarged cross-section showing a web projection in a rim slot just prior to "staking" the web and rim together;

FIGURE 9 is an enlarged cross-section showing a web projection in a rim slot after the "staking" operation;

FIGURE 10 is a side elevaiton of a finished shoe; and

Figure 11:
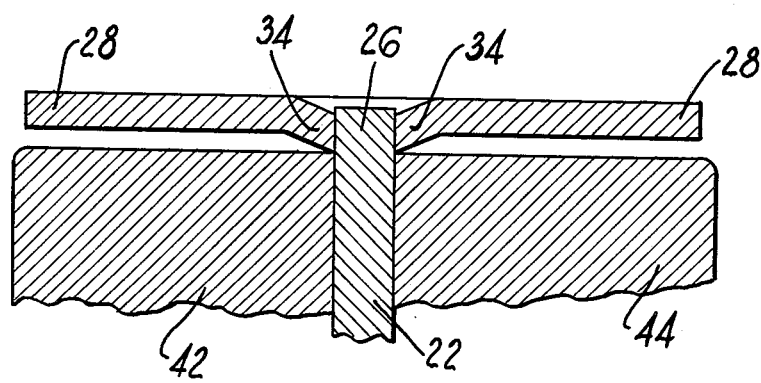
Figure 12:
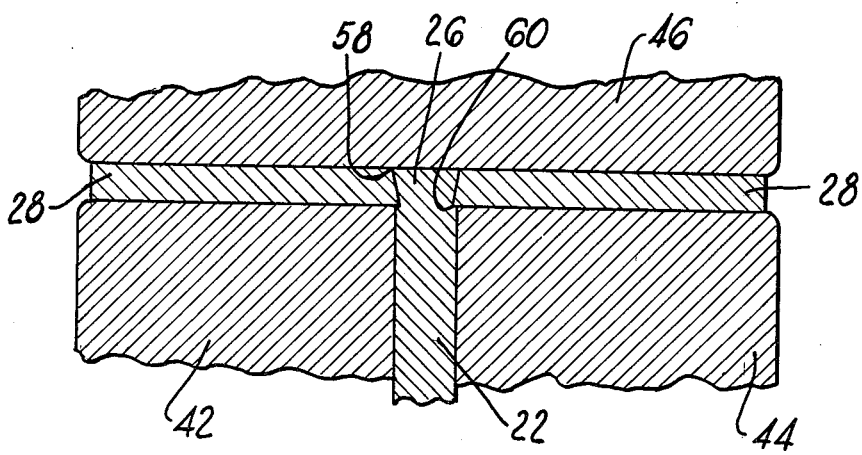

FIGURES 11 and 12 correspond to FIGURES 8 and 9, respectively, but show a modified relationship between the web projection and rim slot.

As shown in FIGURE 1, the web 22 of the brake shoe is a flat member having an arcuate outer edge 24 from which a plurality of projections 26 extend. The web is preferably formed by stamping it from a sheet metal blank, the projections 26 being integral with the body of the web.

The rim 28 of the brake shoe is shown in FIGURES 2 to 4 as it appears after the first forming operation. It is a flat piece of sheet metal having a plurality of depressions 30 spaced longitudinally along its center line. A single stamping operation may be utilized to cut the rim from a sheet metal strip and also form the depressions 30. FIGURES 3 and 4 show the shape of the depressions. As shown in FIGURE 3, the ends 32 of each depression are sheared to provide sharply-defined edges; while, as shown in FIGURE 4, the sides 34 of each depression slope gradually toward the flat center portion 36.

The next step in forming the rim 28 consists in cutting out the center portions 36 of the several depressions to form the slots 38, the slots of FIGURE 6 being somewhat wider than the center portions 36 of FIGURE 4. FIGURES 5 and 6 show the rim after the cutting operation. While the slots 38 are being cut in the rim, rivet holes 40 may also be pierced.

In assembling the web and rim, the web is first mounted in a rotating carrier, or roller, which may consist of two approximately coaxial drums 42 and 44, the body of the web being clamped between the drums, with its projections 26 extending beyond the periphery of the drums (see FIGURES 7 and 8). The roller constituted by the drums 42 and 44 may be a continuously rotating device, into which a web is inserted manually during part of each revolution (see Patent No. 2,041,461 for a detailed description of an operative arrangement). The roller device is so constructed as to hold the web in the proper radial location. The web is tightly clamped during the shoe assembling part of the roller revolution, and the drums open up during another phase of the revolution sufficiently to permit the assembled shoe to drop out.

The flat rim is fed between the lower roller (i.e. drums 42 and 44) and an upper roller 46, which provides the forming pressure. Preferably, an automatic feeding device is used to move the rims horizontally, one at a time, from a hopper in which they are stacked, into the position illustrated in FIGURE 7. The movements of the web and rim are automatically coordinated to bring the first web projection into the first rim slot, as shown in FIGURE 7. The first rim slot is coextensive with the first web projection, in order to prevent relative circumferential movement of the web and rim in the assembled shoe. The rest of the rim slots are longer than the corresponding web projections, because they have to clear the tops of the projections as the rim is wrapped around the web.

FIGURE 8 shows the position of each web projection with respect to the corresponding rim slot, just prior to the rolling operation. The depressed edges 48 of the sides of the rim slot are in engagement with the lower roller, the body of the rim being temporarily out of engagement with the lower roller. In the embodiment of the invention shown in FIGURES 8 and 9, the top 50 of the web projection is slightly below the top edges 52 of the rim slot.

As the pressure of the upper roller comes to bear on the shoe rim, it forces the body of the rim against the lower roller, bringing the sides 34 of the former depressions back into the plane of the remainder of the rim, as illustrated in FIGURE 9. The effect of flattening the depressions 30 during the assembling process is to produce a lateral force acting on the lower edges 48 of the slot 38 in the rim 28. This lateral force on the lower edges 48 of the slot 38 causes it to dig into the projection 26 on the web 22. The result is that the edges 48 of the slot become embedded in the projection 26 and a dovetail connection is thereby formed between the rim 28 and web 26 members. This dovetail connection is the result of reforming the depression 30 into the plane of the rim 28 which causes the aforementioned lateral force on the lower edge 48 of the sides of the slot 38. The distance from the lower edge 48 of the rim depression to the straight portion of the underside of the rim is slightly greater than the distance from the upper edge 52 of the rim depression to the straight portion of the upper side of the rim. This is true because the straight-sided slots are cut after the depressions have been formed; or, explaining it in another way, owing to the fact that the rim is supported from below when the depressions are formed, the arcs of the upper and lower bent edges 54 and 56 are concentric, the radius of the upper edge 54 being longer than the radius of the lower edge 56. Because of this slight difference in distances, the sides of the slots in the assembled rim will tend to take the position shown in FIGURE 9, causing the respective web projections to assume a substantially dovetail shape which locks tightly with the tapered sides of the rim slots.

The effect of the rolling operation on the web projections depends on the relative hardness of the web and rim. If the web is formed of relatively hard material, the edges of the rim slots may not be able to dig into the web projections to the extent shown in FIGURE 9, but an effective gripping engagement will nevertheless result.

FIGURE 12 shows the final result if the web projection is initially allowed to extend slightly above the adjacent upper surface of the rim, as shown in FIGURE 11, and if the web is assumed to be formed of relatively hard material. The flared web projections are present in the assembled shoe, but the upper ends 58 of the projections are wider than the body of the web, and the lower portions 60 of the web projections may or may not be narrower than the body of the web.

As the rim moves between the upper and lower rollers, it is formed to arcuate shape, bringing it into engagement with the arcuate outer edges of the web. The simultaneous forming of the rim to arcuate shape and flattening of the rim depressions to lock the rim to the web provides a completely assembled shoe as the result of a single, rapid assembling operation.

Although certain particular embodiments of my invention have been described, it will be understood by those skilled in the art that the objects of the invention may be attained by the use of constructions different in certain respects from those disclosed without departing from the underlying principles of the invention.

I claim:

1. The method of manufacturing a brake shoe which comprises: providing a web having an arcuate outer edge from which a plurality of projections extend; providing a flat rim having a plurality of depressions so located as to align themselves with the web projections after the rim has been formed to an arcuate shape, each of said depressions having a slot therein, the sides of which are substantially perpendicular to the flat surfaces of the rim; mounting the web on a first roller; feeding the rim between the first roller and a second roller to bring the first web projection into engagement with the first rim slot, with the depressed edges of the sides of the rim slot in engagement with the first roller; and rolling the rim and web between the first and second rollers to simultaneously form the rim to arcuate shape and press the body of the rim against the first roller, thereby substantially realigning the depressed portions with the surfaces of the rim and forcing them into tight engagement with the sides of the web projection.

2. The method of manufacturing a brake shoe which comprises: providing a web having an arcuate outer edge from which a plurality of projections extend; providing a flat rim having a plurality of depressions so located as to align themselves with the web projections after the rim has been formed to an arcuate shape, each of said depressions having a slot therein, the sides of which are substantially perpendicular to the flat surfaces of the rim; and rolling the rim and web between two cyclindrical members to simultaneously form the rim to arcuate shape and interfitting the projections and slots of the web and rim members and substantially realigning the depressed portions with the surfaces of the rim to force them into tight engagement with the sides of the web projections.

3. The method of manufacturing a brake shoe which comprises: providing a web having an arcuate outer edge from which one or more projections extend; providing a flat rim having one or more depressions so located as to align themselves with the web projections after the rim has been formed to an arcuate shape, each of said depressions having a slot therein, the sides of which are substantially perpendicular to the flat surfaces of the rim; and simultaneously forming the rim to arcuate shape and interfitting the projections and slots of the web and rim members and substantially realigning the depressed portions with the surfaces of the rim to force them into tight engagement with the sides of the web projections.

4. The method of manufacturing a brake shoe which comprises: providing a web having an arcuate outer edge from which one or more projections extend; providing a flat rim having one or more depressed portions so located as to align themselves with the web projections after the rim has been formed to an arcuate shape, said depressed portions having sloping sides and sheared ends; a slot near the bottom of the depressions; and simultaneously forming the rim to arcuate shape and interfitting the projections and slots of the web and rim members and substantially realigning the depressed portions with the surface of the rim to force them into tight engagement with the sides of the web projections.

5. The method of manufacturing a brake shoe including a web having an arcuate outer edge from which a plurality of projections extend, the web projections having a substantially dovetail cross-section, comprising the steps of: forming an arcuate web with radially extending circumferentially spaced projections; forming a flat rim having one or more depressions so located as to align themselves with the web projections after the rim has been formed to the arcuate outer edge of the web; forming slots through the depressions for receiving the respective web projections, said slots being formed with sides which are substantially perpendicular to the flat surfaces of the rim; and simultaneously fitting the slots to the respective projections, forming the rim to arcuate shape, and substantially realigning the depressed portions with the surfaces of the rim to force them into tight engagement with the sides of the web projections, the portions of said rim which constitute the sides of the slots being formed with tapered surfaces which fit the dovetailed projections during the aforementioned simultaneous fitting, forming, and realigning steps to secure the rim to the web.

6. The method of manufacturing a brake shoe which comprises: providing a web having an arcuate outer edge from which one or more projections extend; providing a flat rim having one or more depressions so located as to align themselves with the web projections after the rim has been formed to an arcuate shape, each of said depressions having a slot therein, the sides of which are substantially perpendicular to the flat surfaces of the rim; and simultaneously forming the rim to arcuate shape and interfitting the projections and slots of the web and rim members and substantially realigning the depressed portions with the surfaces of the rim to produce a lateral force on the edges of the slots adjacent the body of the rim to cause the edges to dig into the projections, said aligning of the depressions producing a tapered cross-section of the sides of the slots in engagement with the projections thereby forming dovetail connections between the web and rim members.

7. The method of manufacturing a brake shoe which comprises: providing a web having an arcuate outer edge with one or more extending projections; providing a flat rim having one or more depressed portions provided with a slot therein; simultaneously forming the rim to an arcuate shape and interfitting the projections and slots of the web and rim members and applying a compressive force on the face of the rim to substantially realign the depressions with the surface of the rim which causes the edges of the slots adjacent the body of the rim to exert a lateral force against the projections, the sides of said slots thereby being formed to a tapered cross-section which forms a dovetail connection between the web and rim members.

8. The method of manufacturing a brake shoe which comprises: providing a web having an arcuate outer edge with one or more extending projections; providing a flat rim having one or more depressed portions provided with a slot therein; simultaneously forming the rim to an arcuate shape and interfitting the projections and slots of the web and rim members and applying a compressive force on the face of the rim to substantially realign the depressions with the surface of the rim thereby causing the edges of the slots adjacent the body of the rim to exert a lateral force against the projections.

References Cited in the file of this patent

UNITED STATES PATENTS

| | | |
|---|---|---|
| 2,041,461 | Floyd et al. | May 19, 1936 |
| 2,177,191 | Sandberg | Oct. 24, 1939 |

FOREIGN PATENTS

| | | |
|---|---|---|
| 1,053,361 | France | Sept. 30, 1953 |